C. MOORE.
SELF CLEANING RAKE.
APPLICATION FILED JUNE 2, 1919.

1,338,459.

Patented Apr. 27, 1920.

Inventor,
Claude Moore, by
G. C. Kennedy
Attorney.

UNITED STATES PATENT OFFICE.

CLAUDE MOORE, OF CEDAR RAPIDS, IOWA.

SELF-CLEANING RAKE.

1,338,459.   Specification of Letters Patent.   Patented Apr. 27, 1920.

Application filed June 2, 1919. Serial No. 301,162.

*To all whom it may concern:*

Be it known that I, CLAUDE MOORE, a citizen of the United States of America, and a resident of Cedar Rapids, Linn county, Iowa, have invented certain new and useful Improvements in Self-Cleaning Rakes, of which the following is a specification.

My invention relates to improvements in self-cleaning rakes, and the object of my improvement is to supply a hand-rake, whose pronged head is supplied with movable means for removing adherent or gathered material, the head and said removing-means being so mounted movably on an operating handle as to permit most effectiveness in the operation of the said removing-means.

Figure 1:
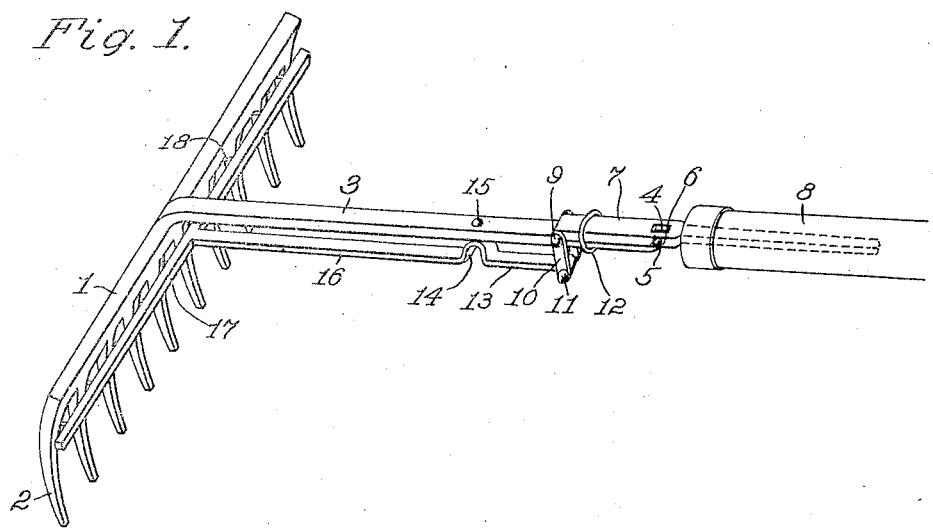
Figure 2:
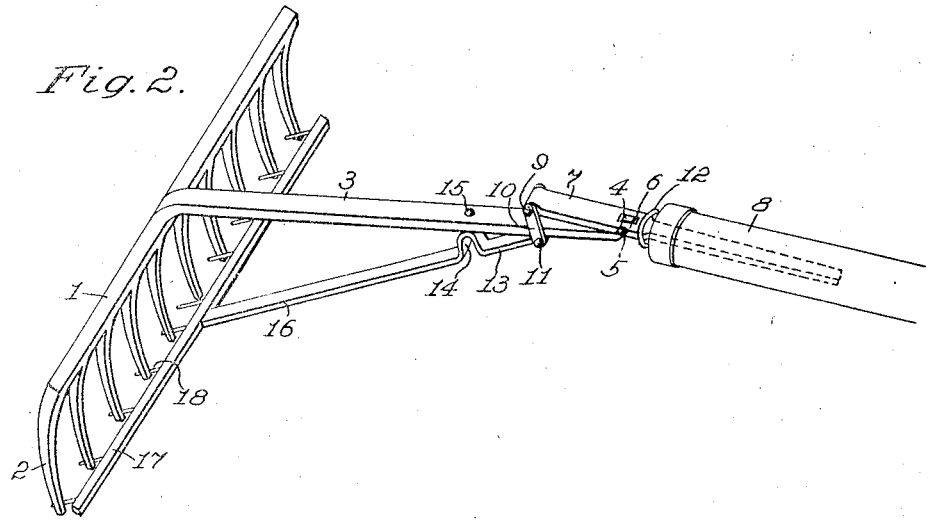

This object I have accomplished by the means which are hereinafter described and claimed, and which are illustrated in the accompanying drawings, in which Figure 1 is a perspective view of a hand-rake equipped with my improved cleaning means, the latter being shown as supported releasably in its upper and inactive position, and Fig. 2 is a like view of the rake with said cleaning or removing means released or dropped relative to the rake-head and handle.

In said drawings, similar numerals of reference denote corresponding parts throughout the several views.

I have shown an ordinary rake-head 1 having a plurality of prongs 2, and provided with a rigid shank 3 directed integrally therefrom at approximately a right angle.

The numeral 8 denotes a handle of the usual elongated form. The numeral 7 denotes a bar having a diminished shank which is driven into the abutting end of said handle, or otherwise secured fixedly thereto in alinement, and said bar has a short longitudinal slot 6 to receive the upwardly curved end 4 of the rake shank 3, the part 4 being pivotally connected to the bar in said slot by a transverse pintle 5.

The numeral 16 denotes another bar or shank-piece having on its free end a cross-bar 17, connected thereto medially and integrally, said cross-bar 17 having along its outer longitudinal edge a number of short rigid pins or teeth 18 which pass between and are located close to the prongs 2 of said rake-head. The shank 16 has a medial part bowed upwardly at 14, with said bowed part pivotally connected to a medial part of the rake-shank 3 on a pivot-pintle 15.

The forward or outer end of the bar 7 is transversely orificed to receive a transverse pintle 9 on whose opposite ends are pivoted a pair of depending short links 10. The rear end of the shank-bar 16, here denominated the part 13 is likewise transversely orificed to receive another pintle 11 on whose opposite ends the lower ends of the links 10 are pivoted.

The numeral 12 denotes a ring or clamping-element which is slidably mounted on the bar 7, and is of dimensions permitting it to also slide over the abutting part of the rake-shank 3.

When it is desired to secure the cross-bar or cleaning-member 17—18 in its upper position, where it will not interfere with the raking use of the rake-head 1 and its prongs 2, the shank 16 is swung upwardly on its medial pivot 15, and the shank 3 is also swung upwardly close to the bar 7, this operation being made possible by reason of the linked or loose joint connections of said parts to said bar 7, and the clamping-ring 12 may then be slid forward to encompass the bar 7 and shank 3, as shown in said Fig. 1, thus connecting the jointed parts rigidly together, whereby the rake may, with its handle 8, be employed as is the ordinary rigid rake.

In case the prongs 2 of the rake become clogged with adherent materials, such as long grass, brush, or other objects, the ring 12 may be slid rearwardly to the position shown in said Fig. 2, thus releasing the said jointed parts, permitting the cleaning member 17—18 to drop, together with the rake-head 1 and its shank 3. The descending teeth 18 in sweeping along the prongs 2 remove adherent materials. It will be seen that the double-jointed connections of the shank 3 and the shank 16 to the rake-handle permit both the rake-head 1 and the cleaning member 17—18 to descend at the same time, the member 17—18 having the greater scope of movement, whereby the weight of the rake-head is added to the gravity of the other member in impelling the latter downwardly, giving the member 17—18 more force in descending and cleaning the rake teeth.

It is to be understood, that various slight modifications may be effected in the form, dimensions and arrangement of the parts of my device, and in the adaptation thereof for hand or other power, without departing from the principles of the invention, or the scope of its protection. The improvement may, in fact, be adapted and mounted or framed for transportation, or to be power-operated, single, or in combination with others, and yet be within my invention.

Having described my invention, what I claim as new, and desire to secure by Letters Patent, is:

1. In a device of the character described, a pronged rake-head having a rigid shank, a supporting-body to which the extremity of said shank is pivoted, a member positioned longitudinally along the prongs of said rake-head having prongs passing between the prongs of the rake-head, said member having a pivotal connection with said shank, and a linked connection with said supporting-body.

2. In a device of the character described, a pronged rake-head, a supporting-body to which the rake-head is movably connected, and a pronged body linked to said supporting-body, whose prongs traverse the interspaces of the prongs of the rake-head at an angle thereto.

3. In a device of the character described, a pronged rake-head, a supporting-body to which the rake-head is movably connected, a pronged body linked to said supporting-body and also pivotally-connected to the rake-head, the prongs of said body traversing the interspaces of the prongs of the rake-head.

4. In a device of the character described, a pronged rake-head, a supporting-body to which the rake-head is pivotally connected, a pronged body linked to said supporting-body and also pivotally connected to said rake-head, whose prongs traverse the interspaces of the prongs of the rake-head, and means for releasably clamping said rake-head and said pronged body to said supporting-body.

5. In a device of the character described, a pronged rake-head, a supporting-body to which the rake-head is pivotally connected, a pronged body linked to said supporting-body and also pivotally connected to the rake-head, whose prongs traverse the interspaces of the prongs of the rake-head, and a clamping-ring mounted slidably upon said supporting-body, movable to engage the abutting parts of the rake-head and said pronged body after the latter are brought into proximity to said supporting-body.

6. In a device of the character described, a rake-head having a plurality of prongs, cleaning-means for said prongs, comprising a member also provided with prongs traversing the interspaces of the prongs of the rake-head at an angle, a supporting-body, means for swingingly connecting both the rake-head and said member to said supporting-body, said member being pivoted to said rake-head, and means for releasably rigidly clamping said rake-head to said supporting-body.

Signed at Waterloo, Iowa, this 24th day of May, 1919.

CLAUDE MOORE.